(12) United States Patent
Dirschbacher et al.

(10) Patent No.: US 7,070,041 B1
(45) Date of Patent: Jul. 4, 2006

(54) LINEAR GUIDE UNIT

(75) Inventors: Josef Dirschbacher, Knetzgau (DE); Stefan Dorn, Arnstein (DE); Roland Greubel, Ramsthal (DE); Roland Hoherz, Poppenhausen (DE)

(73) Assignee: Rexroth Star GmbH, Schweinfurt (DE)

( * ) Notice: Subject to any disclaimer, the term of this patent is extended or adjusted under 35 U.S.C. 154(b) by 433 days.

(21) Appl. No.: 10/343,368

(22) PCT Filed: Aug. 18, 2000

(86) PCT No.: PCT/EP00/08086

§ 371 (c)(1),
(2), (4) Date: Jan. 30, 2003

(87) PCT Pub. No.: WO02/16073

PCT Pub. Date: Feb. 28, 2002

(51) Int. Cl.
*B23Q 1/58* (2006.01)

(52) U.S. Cl. .................... 198/750.1; 198/860.1
(58) Field of Classification Search .............. 198/750.1, 198/750.8, 860.1, 860.2, 860.3, 467.1, 957
See application file for complete search history.

(56) References Cited

U.S. PATENT DOCUMENTS

| | | | | |
|---|---|---|---|---|
| 5,125,140 A | * | 6/1992 | Sticht ..................... | 29/33 P |
| 5,273,381 A | | 12/1993 | Shirai | |
| 5,484,051 A | * | 1/1996 | Nagai et al. ............. | 198/750.7 |
| 5,609,238 A | * | 3/1997 | Christensen .............. | 198/583 |
| 5,915,916 A | * | 6/1999 | Saji ....................... | 414/749.1 |
| 6,036,003 A | * | 3/2000 | Swanson ................. | 198/860.2 |
| 6,308,821 B1 | * | 10/2001 | Asai et al. ............... | 198/750.7 |
| 6,588,584 B1 | * | 7/2003 | Craig et al. ............. | 198/860.1 |
| 6,662,934 B1 | * | 12/2003 | Iida ....................... | 198/750.1 |
| 6,749,057 B1 | * | 6/2004 | Kato ....................... | 198/750.7 |

FOREIGN PATENT DOCUMENTS

| | | |
|---|---|---|
| DE | 38 06 354 A1 | 9/1989 |
| DE | 38 15 595 A1 | 11/1989 |
| EP | 0 768 146 A | 4/1997 |
| GB | 2 194 907 A | 3/1988 |
| WO | 97 14894 A | 4/1997 |

OTHER PUBLICATIONS

Prospekt "LM–Kompaktlineareinheit TYP KR" by the Firm THK CO., LTD., Tokyo Japan, Catalog No. 148G, pp. 1–4.
Prospekt "Star–Praezisionsmodule PSK", Enginering Mannesmann Rexroth, Rexroth Star, RD 82 414/2000–01, pp. 1–49.

* cited by examiner

*Primary Examiner*—Douglas Hess
(74) *Attorney, Agent, or Firm*—Michael J. Striker

(57) ABSTRACT

A linear guide unit has an elongated guide housing having a longitudinal axis and having walls bordering a guide cavity, with two side walls form a longitudinal opening of the guide cavity, a slider that is movably guided in the direction of the longitudinal axis on at least one guide track provided in the guide cavity and connectable with a unit to be moved by the linear guide unit through the longitudinal opening, a drive device for moving the slider in the direction of the longitudinal axis, a profiled channel attachable to the guide housing for housing functional elements, with the positive connection is additionally secured by frictional engagement or by snapping into place, wherein the profiled channel has at least one lateral mounting projection and is in holding contact via this mounting projection with the exposed end of a side wall or a part joined therewith.

30 Claims, 4 Drawing Sheets

LINEAR GUIDE UNIT

BACKGROUND OF THE INVENTION

The invention concerns a linear guide unit, comprising an elongated guide housing having a longitudinal axis and walls bordering a guide cavity, i.e., a bottom wall and two side walls, whereby the two side walls form—between themselves—a longitudinal opening in the guide cavity opposite the bottom wall, comprising a slider that is movably guided in the direction of the longitudinal axis on at least one guide track provided in the guide cavity, whereby this slider is capable of being joined through the longitudinal opening with a unit to be moved by the linear guide unit, comprising a drive device for moving the slider in the direction of the longitudinal axis, and comprising a profiled channel capable of being attached to the guide housing for accommodating functional elements such as position sensors and the like.

Linear guide units of this type are made known in the brochure entitled "LM-Kompaktlineareinheit Typ KR" (LM Compact Linear Guide Unit, Model KR) from THK Co. Lt., and the applicant's brochure entitled "STAR-Linearmodule" (STAR Linear Module). In the case of the linear guide units made known in the THK brochure, the guide housing is designed as an outer rail, while the linear guide units described in the Star brochure comprise a conventional guide housing, in the case of which the at least one guide track is formed by an inner rail produced separately from the guide housing and secured in the guide cavity. With these two types of linear guide units, a profiled channel can be attached to the guide housing, which said profiled channel serves to accommodate the most diverse types of functional elements, such as sensors for detecting the position of the slider. In practice, users complain that fastening said profiled channels to the guide housing is extremely troublesome.

SUMMARY OF THE INVENTION

The object of the present invention, therefore, is to provide a linear guide unit of the type according to the general class, in the case of which the profiled channel can be fastened to the guide housing quickly and easily.

This object is obtained, according to the invention, by means of a linear guide unit of the type described initially, in the case of which the profiled channel comprises at least one lateral mounting projection, and the profiled channel is in holding contact via this mounting projection with the exposed end of a side wall or a part joined therewith. According to the invention, the profiled channel—to be mounted on the guide housing with its at least one lateral mounting projection—need only be pushed onto the exposed end of a side wall of the guide housing. To accomplish this, only a few simple manual steps are required, so that it takes little time to mount the profiled channel on the guide housing.

Preferably, the mounting projection can be designed as a mounting flange extending essentially across the entire length of the profiled channel. To this end, the profiled channel can be extruded in simple fashion as an extruded profile made of plastic or the like. It is also possible, however, to produce the profiled channel as an injection-molded part.

In particular when the linear guide unit is positioned horizontally, it can be sufficient for the mounting projection to be positively engaged with the exposed end of the side wall or the part joined therewith. In order to position the linear guide unit vertically or tilted toward the horizontal plane, however, the positive connection can be additionally secured by means of a friction connection, e.g., using a clamping element, preferably a clamping screw, or by snapping it into place. To make the "snapping into place" possible, a locking nose can be provided, e.g., on the lateral mounting projection of the profiled channel, which said locking nose engages in an associated snap-in recess of the guide housing or a part joined therewith.

In order to ensure that the profiled channel is held—via the positive engagement—as securely as possible against the side wall or the part joined therewith, it is proposed in a further development of the invention that the underside of the mounting projection lie on at least part of the end surface of the exposed end of the side wall or the part joined therewith. Additionally or as an alternative, the exposed end of the side wall or the part joined therewith, on the one hand, and the mounting projection on the other hand are designed to complement each other, at least in sections. For example, on one of the two parts—on the mounting projection on the one hand or the exposed end of the side wall or the part joined therewith on the other hand—at least one projection is provided that is capable of being gripped from behind by an associated hook element provided on the respective other part—the exposed end of the side wall or the part joined therewith on the one hand, or the mounting projection on the other—or it is capable of being encompassed by eyelet element, or, on one of the two parts—the mounting projection on the one hand or the exposed end of the side wall or the part joined therewith on the other hand, at least one recess is provided, into which an associated engaging element provided on the respective other part—the exposed end of the side wall or the part joined therewith on the one hand, or the mounting projection on the other—is capable of being inserted.

Finally, it can be further advantageous if the profiled channel bears against an outer surface of the side wall or the part joined therewith, and is supported there, for example.

As previously discussed with regard for the Star brochure mentioned hereinabove, the at least one guide track can be formed on a guide rail produced separately from the guide housing and secured in the guide cavity. The invention can also be used advantageously, however, with a linear guide unit of the type disclosed in the THK brochure mentioned hereinabove, i.e., a linear guide unit, in the case of which the guide housing is designed as an outer rail.

In conjunction with the present invention, an "outer rail" is understood to mean a guide housing, in the case of which the at least one guide track is provided on an inner surface—facing the guide cavity—of at least one of the walls of the guide housing, and not on a guide rail usually extending from the bottom wall of the guide housing into the guide cavity. The guide track can be formed on a guide track insertion element, however, that is attached to an inner surface of one of the walls of the guide housing, preferably located in a groove formed in one of the walls. Due to this outer rail design, the slider can have a compact, substantially rectangular cross section, i.e., it does not have indentations, in particular, to grip the guide rail, as is the case with the linear guide unit made known in DE 38 15 595 A1, for example.

The guide rail can be made, preferably, of hardened steel. If guide track insertion elements are used, it is sufficient, however, to make these insertion elements out of steel, while the outer rail can be produced, e.g., as a profile-extruded aluminum section.

To fasten the outer rail to a superimposed structural unit, through holes for fastening elements, preferably clamping screws, can be provided, e.g., in the bottom wall of the outer rail. Additionally or as an alternative, it is also possible for the outer rail to be fastenable to a superimposed structural unit by means of clamping components, whereby the clamping components interact with a clamping surface facing away from the superimposed structural unit. In the latter case, it is advantageous in terms of saving space if the clamping surface is part of the bounding face of a clamping recess, preferably a fastening groove, that is provided in the region of at least one transition of the bottom wall and one of the side walls in the outer surface of the outer rail. The aim is to provide an independent safeguard when linear guide units with an outer rail are fastened using clamping components.

To furnish a precision linear guide unit, it is proposed that the slider be supported on the at least one guide track by means of a recirculating rolling element, which is known per se from the related art.

To ensure that the slider is supported on the outer rail securely in all load directions, it is proposed that each side wall of the outer rail comprise at least two guide tracks on its inner surface facing the guide cavity, whereby the pressure lines of the guide tracks form an "X" shape.

In the case of a linear guide unit in which the drive device comprises a recirculating-rolling element screw and nut having a threaded spindle that is supported immovably in the direction of the longitudinal axis at the longitudinal ends of the outer rail, but in a fashion that allows it to turn around a spindle axis extending substantially parallel to the longitudinal axis, and having a threaded nut that is part of the slider, it is further proposed that the spindle axis—when the bottom wall of the outer rail extends substantially horizontally—is located above the horizontal plane that extends through the intersection points of the pressure lines of the guide tracks. As a result, the torque that is produced by the axial force exerted by the unit to be moved and the counterforce of the spindle, is kept at an acceptably low level. The clearance between the spindle axis and the plane extending through the intersection points of the pressure lines of the guide tracks can measure at least 2 mm, for example.

The aim is to provide an independent safeguard for this exemplary embodiment in conjunction with linear guide units having an outer rail.

Furthermore, in the case of such a linear guide unit driven by a recirculating-rolling element screw and nut, the threaded nut can be formed as a unit produced separately from the slider, and said threaded nut can be inserted in an axial passage of the slider. For this exemplary embodiment as well, the aim is to provide an independent safeguard in conjunction with linear guide units having an outer rail. It has the advantage that, by furnishing a number of sliders having differently-formed outer guides on the one hand and a number of threaded spindle/threaded nut units having different designs, on the other hand, a large variety of different types and linear guide units can be offered depending on the special application, and one is therefore able to respond individually to a customer's specific needs.

Even when the drive device comprises a recirculating-rolling element screw and nut having a separately-designed threaded nut, the maintenance work on the linear guide unit can be simplified by providing one common central lubricator for the guide tracks and/or the recirculating rolling elements associated therewith, and for the drive device.

The aim is to provide an independent safeguard for this exemplary embodiment as well in conjunction with linear guide units having an outer rail.

The invention can also be used advantageously with linear guide units equipped with other types of drive devices, e.g., with linear guide units having a belt drive, in particular a toothed belt drive, or with linear guide units having a rack-and-pinion drive.

Various embodiments of the linear guide unit according to the invention are also feasible with regard for the covering of the longitudinal opening of the guide cavity. For example, said longitudinal opening can be left uncovered, as is the case with the linear guide units shown on the cover page of the THK brochure mentioned hereinabove, for example. Moreover, it is also possible to cover the longitudinal opening of the guide cavity using a cover plate.

Finally, it is also feasible to cover the longitudinal opening of the guide cavity using a sealing strip, e.g., a steel strip, as was made known in DE 38 06 354 A1, for example.

The aim is to provide an independent safeguard as well when a linear guide unit having an outer rail is covered by means of a cover strip.

The sealing strip can be guided through a table unit fastened to the slider, and it can be secured to the longitudinal ends of the outer rail. It is also feasible in principle, however, for the sealing strip to be secured at both axial ends of the slider and move together with said slider in the longitudinal direction of the linear guide unit. The sealing strip can be guided—starting at an axial end face of the slider—around return pulleys as a sealing strip loop to the other axial end face of the slider. Finally, and as an alternative, it is also possible to use two sealing strips, each of which is guided toward a winding mechanism on the axial longitudinal ends of the linear guide unit, as used similarly in roller shutters.

In the case of a sealing strip situated in the direction of the longitudinal axis of the guide housing, it is proposed in a further development of the invention that the sealing strip rest on two profiled rails located on the end faces of the side walls of the outer rail. When the sealing strip is designed as a steel strip, it is further advantageous if the profiled rails are made of a non-magnetic and, preferably, non-magnetizable material such as aluminum, since this steel strip can then be held tightly against the profiled rails by means of at least one magnet or magnetic strip located in at least one of the profiled rails.

With regard for the fastening—in accordance with the invention—of the profiled channel to the exposed end of a side wall of the guide housing and/or the outer rail or a part joined with this side wall (the profiled rail in this case), it is particularly advantageous if the shape of a surface facing away from the end face of the side wall of the outer rail of at least one of the profiled rails is substantially identical to this end face. In this case, the same profiled channel can then be used with all cover variants of the linear guide unit according to the invention.

BRIEF DESCRIPTION OF THE DRAWINGS

The invention will be explained in greater detail hereinbelow using exemplary embodiments with reference to the attached drawings.

DESCRIPTION OF THE PREFERRED EMBODIMENTS

Figure 1:
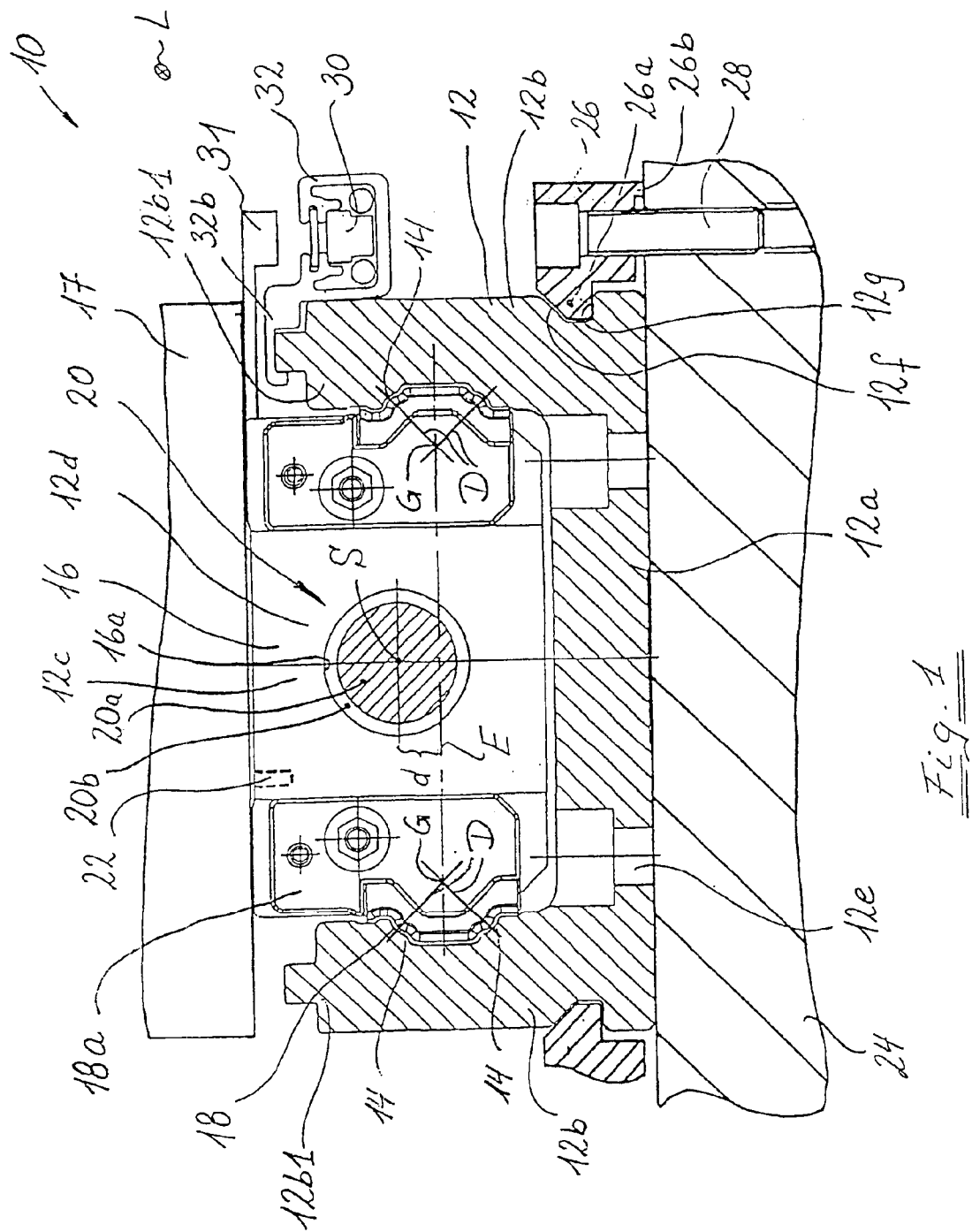
FIG. 1 is an orthogonal sectional view of a linear guide unit according to the invention.

A linear guide unit in general according to the invention is labelled with numeral 10 in FIG. 1. It comprises a guide housing 12 extending in the direction of a longitudinal axis L (orthogonal to the plane of the drawing) having a bottom wall 12a and two side walls 12b projecting substantially orthogonally from said bottom wall, which side walls, together with the bottom wall, form the borders of a guide cavity 12c. The exposed ends 12b1 of the side walls 12b define a longitudinal opening 12d of the guide cavity 12c between them.

In the exemplary embodiment shown, the guide housing 12 is designed as an outer rail. To accomplish this, guide tracks 14 are formed in the inner surfaces of the side walls 12b facing the guide cavity 12c, on which said guide tracks a slider 16 located in the guide cavity 12c is movably guided in the direction of the longitudinal axis L by means of recirculating rolling elements 18, in particular recirculating balls. The end plates comprising the internal grooves of these recirculating rolling elements 18 are labelled 18a in FIG. 1.

In order for the guide housing 12 to have sufficient stiffness and stability to guide the slider 16, it is preferably made of hardened steel. A unit 17 to be moved by the linear guide unit is mounted on the slider 16.

In the exemplary embodiment shown in FIG. 1, a recirculating-rolling element screw and nut 20 having a threaded spindle 20a extending in the longitudinal direction L essentially over the entire length of the guide housing and/or the outer rail 12 is provided to advance the slider 16 and, therefore, the unit 17 to be moved, in the direction of the longitudinal axis L, which said threaded spindle is supported substantially immovably in the axial direction in (not shown) terminal crossmembers of the guide housing 12 by means of a fixed bearing and a movable bearing, but in a manner that allows it to turn around a spindle axis S extending essentially parallel to the longitudinal axis L. A threaded nut 20b associated with the slider 16 is guided on the threaded spindle 20a by means of one or more recirculating rolling elements in a manner that is known per se.

According to the invention, the threaded nut 20b is produced as a separate part from the slider 16, and it is inserted in a spindle passage 16a of this slider in torsion-resistant, axially-fixed fashion. As a result, based on a number of basic slider details that differ, e.g., in terms of the design of the guidance on the outer rail 12, and a number of threaded nuts 20b having different designs, a great number of different types of sliders 16 can be offered to the customer, even though only a comparably small number of different component types must be kept in inventory.

To simplify the maintenance to be performed on the linear guide unit according to the invention, moreover, one central lubricating system is provided, despite the fact that the slider 16 and threaded nut 20b are designed as separate components, which said lubricating system supplies—via a central lubricating connection 22 shown only schematically with dashed lines—the recirculating rolling elements 18 as well as the recirculating-rolling member screw and nut 20 with lubricant, preferably grease or oil.

A further point that is essential to the invention can be seen in the arrangement of the spindle axis S of the recirculating-rolling member screw and nut 20 relative to the guide tracks 14 to linearly guide the slider 16 along the outer rail 12. In fact, the guide tracks 14 are formed on the inner surfaces of the side walls 12b of the outer rail 12 in such a manner that their pressures lines D form an "X" shape. The straight lines G extending through the intersection points of the pressure lines D essentially parallel to the longitudinal axis L span a plane indicated in FIG. 1 with dashed lines. According to the invention, it is now provided that the spindle axis S of the recirculating-rolling member screw and nut 20 is located on the side of this plane E facing away from the bottom wall 12a of the outer rail 12 and, in fact, at a predetermined distance d from said plane, whereby this distance d advantageously measures at least 2 mm.

To secure the outer rail 12 to a superimposed structural unit 24, e.g., a mounting plate, through holes 12e are provided in the bottom wall 12a of the outer rail 12, into which, e.g., clamping screws can be inserted. Moreover, fastening grooves 12f having clamping surfaces 12g are provided in the outer surface of the guide housing 12 in the region of the transition of the bottom wall 12a into the side walls 12b, into which (said fastening grooves) clamping noses 26a of clamping components 26 can be inserted. These clamping components can also be fastened to the superimposed structural unit 24 by means of threaded bolts 28. To make clamping possible, the clamping components 26—on their ends furthest away from the outer rail 12—comprise at least one support foot or a support strip 26b that holds the rest of the clamping component 26 at a slight distance away from the surface of the superimposed structural unit 24, so that, when the clamping bolt 28 is tightened, the clamping nose 26a can be brought tightly into clamping engagement with the clamping surface 12g.

Figure 2:
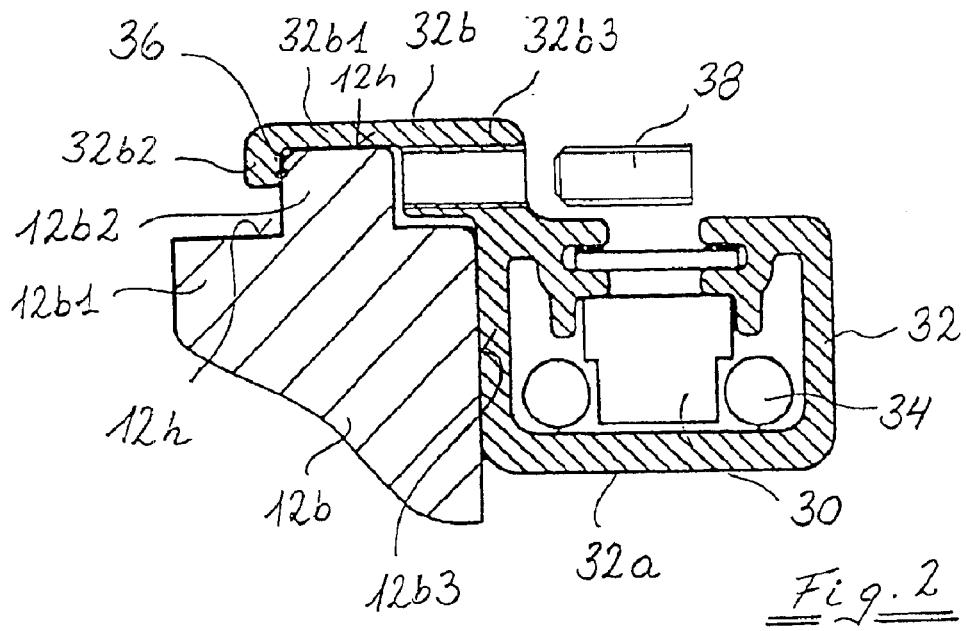
FIG. 2 is a detained view of FIG. 1 to explain the fastening of the profiled channel to the guide housing.

To accommodate a number of functional units, e.g., position sensors 30, that interact with an associated position indicator 31 attached to the slider 16 or the unit 17 to be moved, a mounting channel 32 is provided that is located in the region of the exposed ends 12b1 of the side walls 12b of the outer rail 12. The details of the design of the mounting channel 32 and its attachment to the side walls 12b will be described in greater detail hereinbelow with reference to the enlarged illustration shown in FIG. 2:

The housing channel 32 comprises a hollow profile 32a that serves to accommodate the functional units, e.g., position sensors 30 or electrical leads 34, and it comprises a mounting flange 32b attached to the upper end of the hollow profile 32a and projecting laterally away from the hollow profile 32a. The mounting flange 32b comprises a peg 32b1 pointing away from the hollow profile 32a and a peg 32b2 bent essentially orthogonally in relation to said peg 32b1. With the hook formed by these pegs 32b1 and 32b2, the housing channel 21 can be placed on the end face 12h of the side wall 12b and hooked over a mounting projection 12b2 there. When the profiled channel 23a bears laterally against the outer surface 12b3 of the side wall 12b, as shown in FIGS. 1 and 2, the positive engagement of the holding flange 32b with the holding projection 12b2 is fully sufficient to secure the housing channel 32 to the outer rail 12, when the longitudinal guide unit 10 is positioned horizontally.

To secure this positive engagement, various other measures acting with frictional or non-positive engagement can be used as well. For example, the bent-over peg 32b1 can lock into place with the holding projection 12b2 while utilizing the natural elasticity of the housing channel 32—made preferably of plastic—as indicated by reference numeral 36 in FIG. 2. To accomplish this, a locking nose or a locking strip can be provided on the peg 32b2, and a snap-in recess or a snap-in groove can be provided on the holding projection 12b2.

It is also possible, however, to clamp the holding flange 32b with the holding projection 12b2. To accomplish this, for example, the mounting flange 32b can be designed in such a fashion, for example, that the recess formed between its main body 32b3 and the peg 32b2—the base of which forms the peg 32b1—is designed to be slightly smaller than actually required to accommodate the holding projection 12b2. When the mounting flange 32b is slid onto the holding projection 12b2, the hook element 32b1/32b2 is therefore spread apart and, due to the natural elasticity of the material of the mounting flange 32b, it clamps onto the holding projection 12b2.

Finally, it is also feasible to screw clamping screws, preferably set screws 38, into the main body 32b3 of the holding flange 32b, which said clamping screws are supported against a side wall of the holding projection 12b2, and pull the peg 32b2 into fixed contact against the other side wall of the holding projection 12b2.

The further design of the housing channel 32, in particular the hollow profile 32a, is known per se, and will therefore not be described in greater detail here.

The positive attachment of the profiled channel 32 using the mounting flange 32b can also be accomplished in another manner, of course, as shown in FIG. 2. A few further means for fastening shall be explained hereinbelow with reference to FIGS. 3 and 4.

Figure 3:
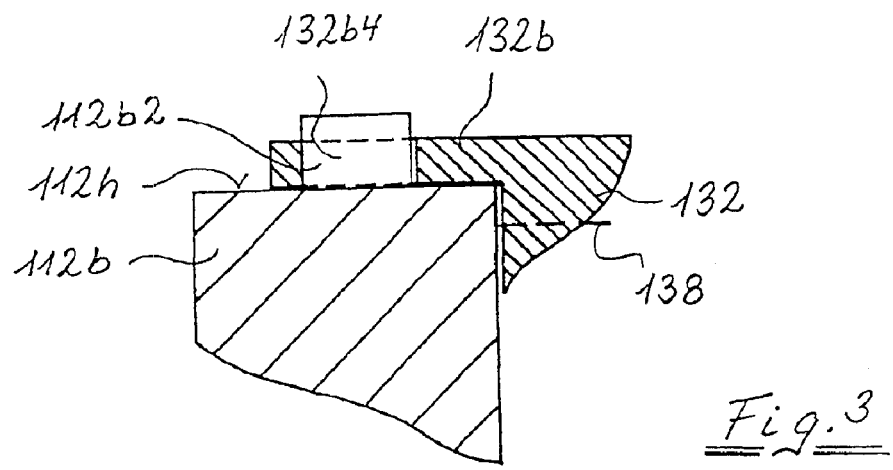
FIGS. 3 and 4 are views similar to FIG. 2 having alternative fastening means for the profiled channel.
Figure 4:
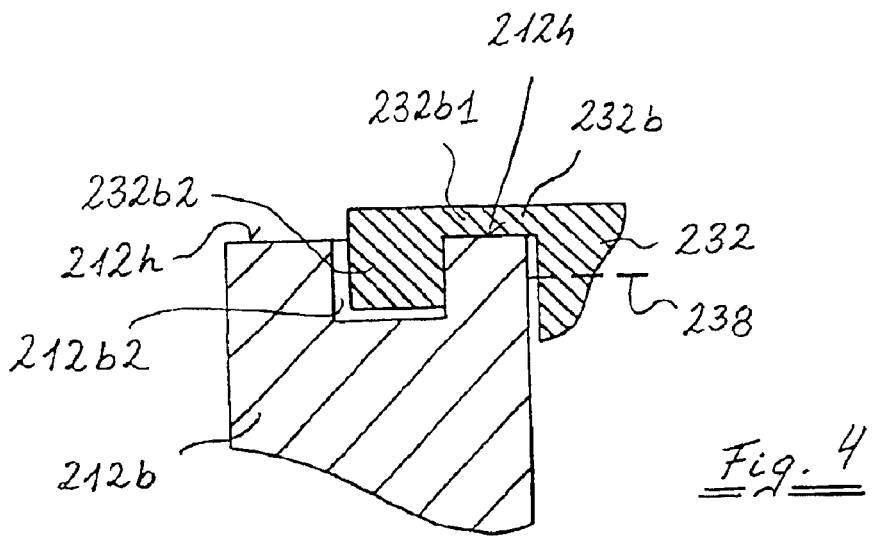

According to FIG. 3, the mounting flange 132b comprises a plurality of passages 132b4 that can be placed on the corresponding holding projections 112b2 on the end face 112h of the side wall 112b. Moreover, it is possible, according to FIG. 4, for the peg 232b2 of the hook element 232b1/232b2 of the mounting flange 232b to be inserted in a holding recess 212b2 formed in the end face 212h of the side wall 212b. It possible, on the one hand, that the holding recess 212b2 is a longitudinal groove extending continuously in the longitudinal direction L, or, as an alternative, it is also possible to provide a plurality of such holding recesses 212b2 in which a corresponding plurality of hook elements 232b1/232b2 engages. With regard for the exemplary embodiment according to FIG. 3 as well as the exemplary embodiment according to FIG. 4, furthermore, clamping means can be provided, as were described hereinabove with regard for the example of the exemplary embodiment according to FIG. 2. Representative thereof, fixing screws 138 and 238 are indicated using dashed lines in FIGS. 3 and 4.

The linear guide unit according to the invention can also have different designs with regard for the covering of the guide cavity 12c. For example, the guide cavity 12c of the linear guide unit 10 according to FIG. 1 does not have a cover at all.

Figure 5:
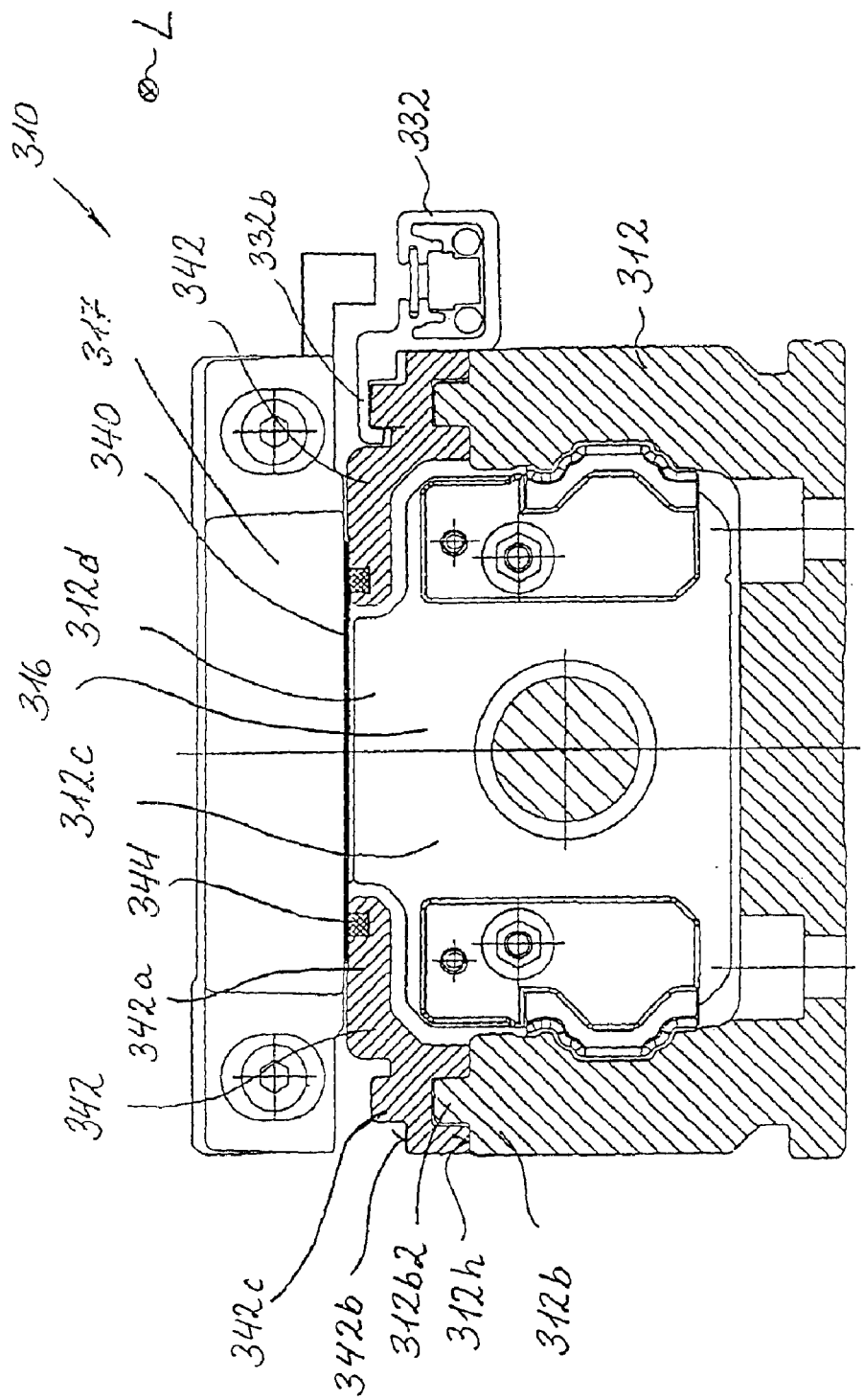
FIG. 5 is a view similar to FIG. 1 having a linear guide unit comprising a strip cover.

In the case of the linear guide unit 310 according to FIG. 5, on the other hand, the longitudinal opening 312d of the guide cavity 312c of the outer rail 312 is covered by means of a covering strip 340, as made known, e.g., in DE 38 06 354 A1 for linear guide units having inner rails. The cover strip 340 is secured at its two longitudinal ends to the terminal crossmembers (not shown)—mentioned hereinabove—of the outer rail 312 and is guided through a longitudinal passage of the table 317 mounted on the slider 316.

In the regions in front of and behind the table 317, the cover strip 340 lies on profiled strips 342 that are placed on the end faces 312h of the exposed ends 312b of the outer rail 312 and are preferably made of aluminum. Magnetic elements 344 are located in the region of the facing exposed ends 342a of the profiled strip 342, which said magnetic elements attract the cover strip 340—preferably made of steel—and therefore ensure a reliable sealing-off of the guide cavity 312c. A plurality of magnetic elements 344 can be distributed across the length of the outer rail 312, and a magnetic strip or an arrangement of magnetic strips can be provided that extends continuously across the length of the outer rail 312.

So that the housing channel 332 can still be secured in the usual fashion using its mounting flange 332b despite the arrangement of the profiled strip 342 on the end faces 312h of the exposed ends 312b of the outer rail 312, a surface 342b of the profiled strips facing away from the end face 312h of the side wall 312b of the outer rail 312 is designed—at least as far as the mounting and/or holding devices for the housing channel 332 are concerned—exactly like the exposed end 312b of the outer rail 312 in the region of the end face 312h. That is, in the case of the mounting variant shown in FIGS. 1 and 2, a holding projection 342c is formed on the surface 342b of the profiled rails 342, the shape of which is essentially identical to that of the holding projection 312b2.

As a result, starting with exactly the same outer rail 312, a linear guide unit 10 without a cover (refer to FIG. 1), a linear guide unit 310 having a strip cover (refer to FIG. 5), as well as a linear guide unit 410 having a plate cover (refer to FIG. 6)—which will be explained next—can be realized, whereby it is simultaneously ensured that exactly the same kind of housing channel can be used and secured to the outer rail or a part joined therewith, i.e., the profiled rail.

Figure 6:
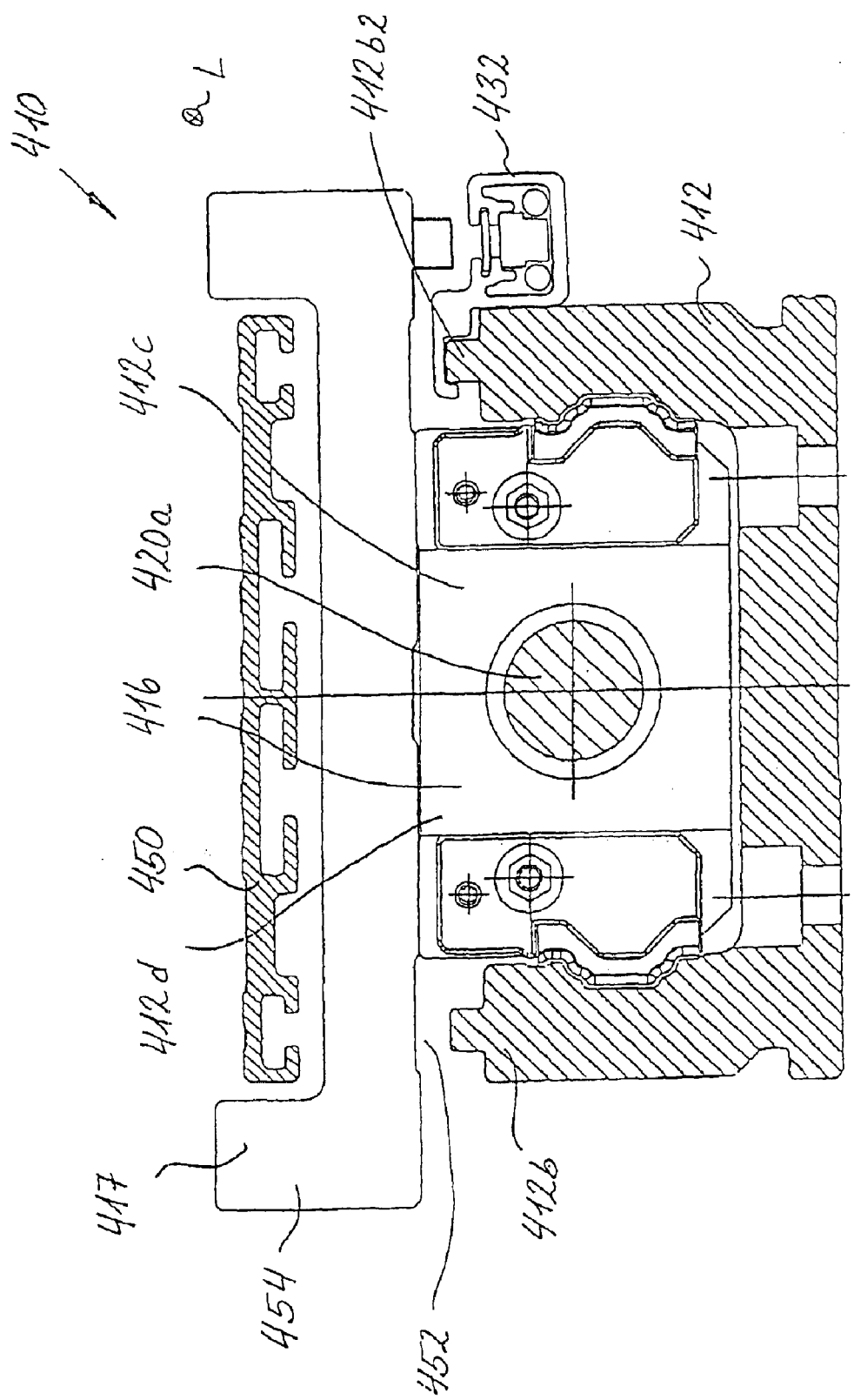
FIG. 6 shows a linear guide unit according to the invention having a plate cover.

As indicated many times hereinabove, the linear guide unit according to the invention as shown in FIG. 6 can also be designed as a linear guide unit 410 having a plate cover. The cover plate 450 provided for this is fastened at the two longitudinal ends of the outer rail 412, e.g., in the region of the terminal crossmembers (not shown) that support the threaded spindle. Open gaps 452 exist between the exposed end 412b of the outer rail 412 and the cover plate 450 that are designed large enough so that, on the one hand, mounting arms 454 of the slider 416 or a part 417 mounted thereon can be guided through it from out of the guide cavity 412c and joined there with a functional unit to be moved by the linear guide unit 410, and, on the other hand, sufficient space is available to attach the housing channel 432, which, in this case as well, is hooked onto a holding projection 412b of the exposed end 412b of the outer rail 412.

What is claimed is:

1. A linear guide unit (10; 310; 410), comprising:
    an elongated guide housing (12; 312; 412) having a longitudinal axis (L) and having walls bordering a guide cavity (12c), namely a bottom wall (12a) and two side walls (12b), whereby the two side walls (12b) form a longitudinal opening (12d) of the guide cavity (12c) between themselves,
    a slider (16) that is movably guided in the direction of the longitudinal axis (L) on at least one guide track (14) provided in the guide cavity (12c), whereby this slider (16) is capable of being joined with a unit to be moved by the linear guide unit (10; 310; 410) through the longitudinal opening (12d),
    a drive device (20) for moving the slider (16) in the direction of the longitudinal axis (L),
    a profiled channel (32; 132; 232; 332; 432) capable of being attached to the guide housing (12; 312; 412) for housing functional elements, wherein the profiled channel (32; 132; 232; 332; 432) comprises at least one lateral mounting projection (32*b*; 132*b*; 232*b*), and wherein the profiled channel (32; 132; 232; 332; 432) is in a positively engaged connection via this mounting projection (32*b*; 132*b*; 232*b*) with the exposed end of a side wall (12*b*; 112*b*; 212*b*) or a part (342) joined therewith, and wherein the positive connection is additionally secured by means of frictional engagement or by snapping into place (36).

2. The linear guide unit according to claim 1, wherein the mounting projection (32*b*; 132*b*; 232*b*) is designed as a mounting flange (32*b*) extending essentially across the entire length of the profiled channel (32).

3. The linear guide unit according to one of the claim 1, wherein the underside of the mounting projection (32*b*; 132*b*; 232*b*) lies on at least part of the end surface (12*h*; 112*h*; 212*h*; 342*b*) of the exposed end of the side wall (12*b*; 112*b*; 212*b*) or the part (342) joined therewith.

4. The linear guide unit according to claim 1 wherein the exposed end of the side wall (12*b*; 112*b*; 212*b*) or the part (342) joined therewith, on the one hand, and the mounting projection (32*b*; 132*b*; 232*b*) on the other hand are designed to complement each other, at least in sections.

5. The linear guide unit according to claim 4, wherein, on one of the two parts—on the mounting projection on the one hand or the exposed end of the side wall (12*b*; 112*b*) or the part (342) joined therewith on the other hand—at least one projection (12*b*2; 112*b*2; 342*c*) is provided that is capable of being gripped from behind by an associated hook element (32*b*2) provided on the respective other part—the exposed end of the side wall or the part joined therewith on the one hand, or the mounting projection (32*b*; 132*b*; 332*b*) on the other—or it is capable of being encompassed by eyelet element (132*b*4).

6. The linear guide unit according to claim 4, wherein, on one of the two parts—the mounting projection (132*b*) on the one hand or the exposed end of the side wall (212*b*) or the part joined therewith on the other hand, at least one recess (132*b*4; 212*b*2) is provided, into which an associated engaging element (112*b*2; 232*b*2) provided on the respective other part—the exposed end of the side wall (112*b*) or the part joined therewith on the one hand, or the mounting projection (232*b*) on the other—is capable of being inserted.

7. The linear guide unit according to claim 1, wherein the profiled channel (32) bears against an outer surface (12*b*3) of the side wall (12*b*) of the part joined therewith.

8. The linear guide unit according to claim 1, wherein the at least one guide track is formed on a guide rail produced separately from the guide housing and secured in the guide cavity.

9. The linear guide unit according to claim 1, wherein the guide housing is designed as an outer rail (12).

10. The linear guide unit according to claim 9, wherein the outer rail (12) is made of steel.

11. The linear guide unit according to claim 10, wherein each side wall (12*b*) of the outer rail (12) comprises at least two guide tracks (14) on its inner surface facing the guide cavity (12*c*), whereby pressure lines (D) of the guide tracks (14) form an "X" shape.

12. The linear guide unit according to claim 10, wherein the outer rail (12) is made of steel which is hardened steel.

13. The linear guide unit according to claim 9, wherein the bottom wall (12*a*) of the outer rail (12) comprises through holes (12*e*) for fastening elements, for fastening the outer rail (12) to a superimposed structural unit (24).

14. The linear guide unit according to claim 13, wherein the fastening elements are studs.

15. The linear guide unit according claim 9, wherein the outer rail (12) is capable of being fastened to a superimposed structural unit (24) by means of clamping components (26), whereby the clamping components (26) interact with a clamping surface (12*g*) facing away from the superimposed structural unit (24).

16. The linear guide unit according to claim 15, wherein the clamping surface (12*g*) is part of the bounding face of a clamping recess (12*f*), preferably a fastening groove, that is provided in the region of at least one transition of the bottom wall (12*a*) and one of the side walls (12*b*) in the outer surface of the outer rail (12).

17. The linear guide unit according to claim 9, wherein the longitudinal opening (412*d*) of the guide cavity (412*c*) is covered by means of at least one cover plate (450).

18. The linear guide unit according to claim 1, wherein the slider (16) is supported on the at least one guide track (14) by means of a recirculating roller element (18).

19. The linear guide unit according to of claim 1, wherein in the case of which the drive device comprises a recirculating-rolling element screw and nut (20) having a threaded spindle (20*a*) that is supported immovably in the direction of the longitudinal axis (L) at the longitudinal ends of the outer rail (12), but in a fashion that allows it to turn around a spindle axis (S) extending substantially parallel to the longitudinal axis (L), and having a threaded nut (20*b*) that is part of the slider (16), wherein the spindle axis (S)—when the bottom wall (12*a*) of the outer rail (12) extends substantially horizontally—is located above the horizontal plane (E) that extends through the intersection points of pressure lines (D) of the guide tracks.

20. The linear guide unit according to the preamble of claim 19, wherein the threaded nut (20*b*) is produced as a separate unit from the slider (16) and is inserted in an axial passage (18*a*) of the slider (16).

21. A linear guide unit (10; 310; 410), comprising:

an elongated guide housing (12; 312; 412) having a longitudinal axis (L) and having walls bordering a guide cavity (12*c*), namely a bottom wall (12*a*) and two side walls (12*b*), whereby the two side walls (12*b*) form a longitudinal opening (12*d*) of the guide cavity (12*c*) between themselves, a slider (16) that is movably guided in the direction of the longitudinal axis (L) on at least one guide track (14) provided in the guide cavity (12*c*), whereby this slider (16) is capable of being joined with a unit to be moved by the linear guide unit (10; 310; 410) through the longitudinal opening (12*d*), a drive device (20) for moving the slider (16) in the direction of the longitudinal axis (L), a profiled channel (32; 132; 232; 332; 432) capable of being attached to the guide housing (12; 312; 412) for housing functional elements, wherein the profiled channel (32; 132; 232; 332; 432) comprises at least one lateral mounting projection (32*b*; 132*b*; 232*b*), and wherein the profiled channel (32; 132; 232; 332; 432) is in holding contact via this mounting projection (32*b*; 132*b*; 232*b*) with the exposed end of a side wall (12*b*; 112*b*; 212*b*) or a part (342) joined therewith, wherein the longitudinal opening (312*d*) of the guide cavity (312*c*) is covered by means of a sealing strip (340), such as a steel strip.

22. The linear guide unit according to claim 21, wherein the sealing strip (340) extends through a table unit fastened to the slider (316) and is fastened to the longitudinal ends of the outer rail (312).

23. The linear guide unit according to claim 21, wherein the sealing strip (340) rests on two shaped rails (342) that are located on the end surfaces (312*h*) of the side walls (312*b*) of the outer rail (312).

24. The linear guide unit according to claim 23, wherein the shaped rails (342) are made of a non-magnetic and preferably non-magnetizable material such as aluminum.

25. The linear guide unit according to claim 23, wherein at least one magnet (344) and/or at least one magnetic strip is located in at least one of the shaped rails (342).

26. The linear guide unit according to of claim 23, wherein at least one of the shaped rails (342) has—on a surface (342*b*) facing away from the end surface (312*h*) of the side wall (312*b*) of the outer rail (312)—a shape that is substantially identical to this end surface (312*h*).

27. The linear guide unit according to claim 1, wherein the profiled channel (32; 132; 232; 332; 432) is capable of being attached to the guide housing (12; 312; 412) for housing functional components which are position sensors (30).

28. The linear guide unit according to claim 1, wherein the positive connection additionally secured by means of frictional engagement uses a clamping element (38; 138, 238).

29. The linear guide unit according to claim 28, wherein the clamping element is a clamping screw.

30. A linear guide unit (10; 310; 410), comprising:

an elongated guide housing (12; 312; 412) having a longitudinal axis (L) and having walls bordering a guide cavity (12*c*), namely a bottom wall (12*a*) and two side walls (12*b*), whereby the two side walls (12*b*) form a longitudinal opening (12*d*) of the guide cavity (12*c*) between themselves.

a slider (16) that is movably guided in the direction of the longitudinal axis (L) on at least one guide track (14) provided in the guide cavity (12*c*), whereby this slider (16) is capable of being joined with a unit to be moved by the linear guide unit (10; 310; 410) through the longitudinal opening (12*d*), a drive device (20) for moving the slider (16) in the direction of the longitudinal axis (L), a profiled channel (32; 132; 232; 332; 432) capable of being attached to the guide housing (12; 312; 412) for housing functional elements, wherein the profiled channel (32; 132; 232; 332; 432) comprises at least one lateral mounting projection (32*b*; 132*b*; 232*b*), and wherein the profiled channel (32; 132; 232; 332; 432) is in holding contact via this mounting projection (32*b*; 132*b*; 232*b*) with the exposed end of a side wall (12*b*; 112*b*; 212*b*) or a part (342) joined therewith, wherein a common central lubricator (22) is provided for the guide tracks (14) and/or recirculating rolling elements (18) associated therewith, and for the drive device (20).

* * * * *